(12) United States Patent
Beckley et al.

(10) Patent No.: US 8,013,068 B2
(45) Date of Patent: Sep. 6, 2011

(54) MICHAEL ADDITION COMPOSITIONS

(75) Inventors: Ronald Scott Beckley, Gilbertsville, PA (US); Thomas Frederick Kauffman, Harleysville, PA (US); Michael John Zajaczkowski, York, PA (US); Mai Chen, Hoffman, IL (US); Joseph James Zupancic, Glen Ellyn, IL (US)

(73) Assignee: Rohm and Haas Company, Philadelphia, PA (US)

( * ) Notice: Subject to any disclaimer, the term of this patent is extended or adjusted under 35 U.S.C. 154(b) by 2051 days.

(21) Appl. No.: 10/660,186

(22) Filed: Sep. 11, 2003

(65) Prior Publication Data

US 2005/0081995 A1    Apr. 21, 2005

Related U.S. Application Data

(60) Provisional application No. 60/437,692, filed on Jan. 2, 2003.

(51) Int. Cl.
  C08G 73/02    (2006.01)
  C08G 69/48    (2006.01)
  C12C 7/26    (2006.01)
(52) U.S. Cl. .............. 525/185; 525/421; 428/524
(58) Field of Classification Search .......... 525/185, 525/421; 428/524
  See application file for complete search history.

(56) References Cited

U.S. PATENT DOCUMENTS

| | | | |
|---|---|---|---|
| 4,217,396 A | 8/1980 | Heckles | |
| 4,217,439 A | 8/1980 | Heckles | |
| 4,408,018 A | 10/1983 | Bartman | |
| 4,602,061 A | 7/1986 | Akkerman | |
| 4,644,036 A | 2/1987 | Walz | |
| 4,804,715 A | 2/1989 | Leonard | |
| 4,871,822 A | 10/1989 | Brindopke | |
| 5,017,649 A | 5/1991 | Clemens | |
| 5,084,536 A | 1/1992 | Brindopke | |
| 5,132,367 A | 7/1992 | Chan | |
| 5,159,024 A | 10/1992 | Brindopke | |
| 5,219,958 A | 6/1993 | Noomen | |
| 5,416,136 A | 5/1995 | Konzmann | |
| 5,459,178 A | 10/1995 | Chan | |
| 5,496,896 A | 3/1996 | Alfons | |
| 5,539,017 A * | 7/1996 | Rheinberger et al. | 523/116 |
| 5,565,525 A * | 10/1996 | Morimoto et al. | 525/259 |
| 5,763,546 A * | 6/1998 | Jung et al. | 526/87 |
| 5,945,489 A * | 8/1999 | Moy et al. | 525/471 |
| 5,959,028 A * | 9/1999 | Irie et al. | 525/10 |
| 5,969,046 A | 10/1999 | Schindler | |
| 6,011,114 A * | 1/2000 | Liles et al. | 524/837 |
| 6,025,410 A * | 2/2000 | Moy et al. | 522/182 |
| 6,057,001 A | 5/2000 | Schooderwoerd | |
| 6,204,343 B1 | 3/2001 | Barucha | |
| 6,300,388 B1 * | 10/2001 | Verdonck et al. | 522/173 |
| 6,521,716 B1 * | 2/2003 | Leake | 525/421 |
| 6,673,851 B2 * | 1/2004 | Moy et al. | 522/173 |
| 6,706,414 B1 * | 3/2004 | Dammann et al. | 428/524 |
| 2003/0165701 A1 * | 9/2003 | Straw | 428/500 |

FOREIGN PATENT DOCUMENTS

| | | |
|---|---|---|
| EP | 0 227 454 | 7/1987 |
| EP | 0 697 444 | 2/1996 |
| EP | 0 808 860 | 11/1997 |
| EP | 1 283 235 | 2/2003 |
| JP | 07258018 A * | 10/1995 |
| JP | 1998/330690 | 12/1998 |
| WO | WO 91/09910 | 7/1991 |
| WO | WO 01/46332 | 6/2001 |

OTHER PUBLICATIONS

R. J. Clemens, Journal of Coatings Technology, vol. 61, No. 770, pp. 83-91, 1989, "Comparison of Catalysts for Crosslinking Acetoacetylated Resins via the Michael Reaction".
F. Del Rector, Journal of Coating Technology, vol. 61, No. 771, pp. 31-37, 1989, "Applications for Acetoacetyl Chemistry in Thermoset Coatings".
J. S. Witzeman, Journal of Coating Technology, vol. 62, No. 789, pp. 101-112, 1990, "Comparison of Methods for the Preparation of Acetoacetylated Coating Resins".
N. Pietschmann, Progress in Organic Coatings, vol. 36, No. 1-2, pp. 64-69, 1999, "Investigation Into Vinylogic Addition Reactions of Modified Polyester Resins".
N. Pietschmann, Proceedings of the XXV FATIPEC Conference, pp. 119-133, 2000, "Vinylogic Addition Reactions Between Acrylates and Modified Polyester Resins".

* cited by examiner

Primary Examiner — Michael M Bernshteyn
(74) Attorney, Agent, or Firm — Carl P. Hemenway

(57) ABSTRACT

A curable mixture is provided that is substantially free of volatile nonreactive compounds. Also provided is a method for making such curable mixtures, and a method of bonding substrates with such curable mixtures.

20 Claims, No Drawings

MICHAEL ADDITION COMPOSITIONS

CROSS-REFERENCE TO RELATED APPLICATIONS

This is a Non-Provisional U.S. patent application of U.S. Provisional Patent Application No. 60/437,692, filed Jan. 2, 2003.

BACKGROUND

This invention pertains to a composition which is particularly useful as an adhesive as well as a method of making an adhesive composition and a method of using an adhesive composition.

Many compositions that are useful as coatings, adhesives, sealants, and/or elastomers are cured. That is, they undergo useful chemical reactions that build molecular weight. Curing reactions may consist of one or more of the following functions: polymerization, branching of polymers, crosslinking of polymers, and formation of crosslinked networks. One chemical reaction known to be useful for the cure of compositions is the Michael addition reaction. For example, U.S. Pat. No. 5,084,536 discloses the use of Michael addition in the formation of cured lacquers. One difficulty with this technology, however, is that the Michael addition reaction requires the presence of a strong base catalyst, and such catalysts require the presence of a volatile solvent, or they produce other nonreactive volatile molecules during the cure process, or both. The presence of volatile nonreactive compounds such as solvents and products of cure processes is generally undesirable, and it is usually necessary to remove them, which requires extra effort and expense.

The problem addressed by the present invention is the provision of polymer compositions that can be formed and/or crosslinked by the Michael addition reaction without the use or production of substantial amounts of volatile non-reactive compounds.

STATEMENT OF THE INVENTION

In a first aspect of the present invention there is provided a curable mixture comprising at least one multi-functional Michael donor, at least one multi-functional Michael acceptor, and at least one anion of a Michael donor, wherein said curable mixture comprises 5% or less by weight non-reactive volatile compounds, based on the total weight of said curable mixture.

In a second aspect of the present invention there is provided a method comprising reacting a curable mixture comprising at least one multi-functional Michael donor, at least one multi-functional Michael acceptor, and at least one anion of a Michael donor, wherein said curable mixture comprises 5% or less by weight non-reactive volatile compounds, based on the total weight of said curable mixture.

In a third aspect of the present invention there is provided a method comprising applying a layer of a curable mixture to a substrate and contacting at least one additional substrate to said layer; wherein said curable mixture comprises at least one multi-functional Michael donor, at least one multi-functional Michael acceptor, and at least one anion of a Michael donor; and wherein said curable mixture comprises 5% or less by weight non-reactive volatile compounds, based on the total weight of said curable mixture.

DETAILED DESCRIPTION OF THE INVENTION

As used herein, "(meth)acrylate" means acrylate or methacrylate, and "(meth)acrylic" means acrylic or methacrylic.

The present invention involves the use of compounds with functional groups capable of undergoing a Michael addition reaction. Michael addition is taught, for example, by R T Morrison and R N Boyd in *Organic Chemistry*, third edition, Allyn and Bacon, 1973. The reaction is believed to take place between a Michael donor and a Michael acceptor, in the presence of a strong base catalyst.

A "Michael donor," as used herein, is a compound with at least one Michael donor functional group, which is a functional group containing at least one Michael active hydrogen atom, which is a hydrogen atom attached to a carbon atom that is located between two electron-withdrawing groups such as, for example, C=O and/or C=N. Examples of Michael donor functional groups are malonate esters, acetoacetate esters, malonamides, and acetoacetamides (in which the Michael active hydrogens are attached to the carbon atom between two carbonyl groups); further examples of Michael donor functional groups are cyanoacetate esters and cyanoacetamides (in which the Michael active hydrogens are attached to the carbon atom between the carbonyl group and the cyano group). A compound with two or more Michael active hydrogen atoms is known herein as a multi-functional Michael donor. A Michael donor may have one, two, three, or more separate Michael donor functional groups. Each Michael donor functional group may have one or two Michael active hydrogen atoms. The total number of Michael active hydrogen atoms on the molecule is the functionality of the Michael donor. As used herein, the "skeleton" of the Michael donor is the portion of the donor molecule other than the Michael donor functional group(s).

The practice of the present invention includes the use of anions of Michael donors. An anion of a Michael donor is a molecule whose composition is that of a Michael donor, at least one of whose Michael active hydrogens has been abstracted. By abstraction of a hydrogen is meant herein that the proton (i.e., the hydrogen cation) has been removed, leaving behind an excess electron, making the molecule an anion.

A "Michael acceptor," as used herein, is a compound with at least one Michael acceptor functional group with the structure (I):

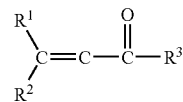

where $R^1$, $R^2$, and $R^3$ are, independently, hydrogen or organic radicals such as for example, alkyl (linear, branched, or cyclic), aryl, alkaryl, including derivatives and substituted versions thereof. $R^1$, $R^2$, and $R^3$ may or may not, independently, contain ether linkages, carboxyl groups, further carbonyl groups, thio analogs thereof, nitrogen containing groups, or combinations thereof. A compound with two or more functional groups, each containing structure (I), is known herein as a multi-functional Michael acceptor. The number of functional groups containing structure (I) on the molecule is the functionality of the Michael acceptor. As used herein, the "skeleton" of the Michael acceptor is the portion of the donor molecule other than structure (I). Any structure (I) may be attached to another (I) group or to the skeleton directly. The structure (I) may be attached to the Michael acceptor molecule through any one or more of $R^1$, $R^2$, or $R^3$.

It is generally believed that reacting a Michael donor with functionality of 2 with a Michael acceptor with a functionality of 2 will lead to linear molecular structures. Often, it is desirable to create molecular structures that are branched and/or crosslinked, which is believed to require the use of at least one ingredient with functionality of 3 or greater. Therefore, it is preferred to have the multi-functional Michael donor or the multi-functional Michael acceptor or both have functionality of 3 or greater.

In the practice of the present invention, the skeleton of the multi-functional Michael acceptor may be the same or different from the skeleton of the multi-functional Michael donor. In some embodiments, one or more polyhdric alcohol is used as at least one skeleton. Some polyhdric alcohols suitable as skeletons for either the multi-functional Michael acceptor or the multi-functional Michael donor include, for example, alkane diols, alkylene glycols, glycerols, sugars, pentaerythritols, polyhydric derivatives thereof, or mixtures thereof. Some examples of polyhdric alcohols suitable as skeletons are cyclohexane dimethanol, hexane diol, castor oil, trimethylol propane, glycerol, ethylene glycol, propylene glycol, pentaerythritol, similar polyhydric alcohols, substituted versions thereof, and mixtures thereof.

In some embodiments of the present invention, the skeleton of the multi-functional Michael donor or of the multi-functional Michael acceptor or of both is an oligomer or a polymer. A polymer, as used herein and as defined by F W Billmeyer, JR. in *Textbook of Polymer Science*, second edition, 1971 is a relatively large molecule made up of the reaction products of smaller chemical repeat units. Normally, polymers have 11 or more repeat units. Polymers may have structures that are linear, branched, star shaped, looped, hyperbranched, or crosslinked; polymers may have a single type of repeat unit ("homopolymers") or they may have more than one type of repeat unit ("copolymers"). As used herein, "resin" is synonymous with polymer.

Polymers have relatively high molecular weights. Polymer molecular weights can be measured by standard methods such as, for example, size exclusion chromatography or intrinsic viscosity. Generally, polymers have weight-average molecular weight (Mw) of 1,000 or more. Some polymers have extremely high Mw; typical polymers have Mw of 1,000,000 or less.

"Oligomers" as used herein are structures similar to polymers expect that oligomers have fewer repeat units and have lower molecular weight. Normally oligomers have 2 to 10 repeat units. Generally, oligomers have Mw of 400 to 1,000.

In some embodiments, oligomers and/or polymers may be used as one or more skeleton. One reason for using oligomers and/or polymers as one or more skeleton is to provide the functional mixture with the desired viscosity. Also, in embodiments in which the functional mixture will be used as an adhesive, oligomers and/or polymers are believed to improve the green strength of the adhesive (that is, the adhesive strength obtained before the cure reactions are complete).

Some embodiments of the present invention include skeletons that are polymers with Mw of 50,000 or less; in such embodiments, preferred are polymers with Mw of 25,000 or less; more preferred are polymers with Mw of 10,000 or less; more preferred are polymers with Mw of 5,000 or less.

In the curable mixtures of the present invention, the relative proportion of multi-functional Michael acceptors to multi-functional Michael donors can be characterized by the reactive equivalent ratio, which is the ratio of the number of all the functional groups (I) in the curable mixture to the number of Michael active hydrogen atoms in the mixture. In some embodiments, the reactive equivalent ratio is 0.1:1 or higher; preferred is 0.2:1 or higher; more preferred is 0.3:1 or higher; still more preferred is 0.4:1 or higher; most preferred is 0.45:1 or higher. In some embodiments, the reactive equivalent ratio is 2:1 or lower; preferred is 1.5:1 or lower; more preferred is 1.25:1 or lower.

It is preferable in the practice of the present invention to choose multi-functional Michael donors, multi-functional Michael acceptors, anion of a Michael donor, and any other ingredients so that the mixture thereof is homogeneous (i.e., the mixture will not phase separate upon standing or curing.)

The multi-functional Michael acceptor of the present invention may have any of a wide variety of skeletons. In some embodiments, the skeleton of the multi-functional Michael acceptor is the residue of a polyhydric alcohol, such as, for example, those listed herein above. In some embodiments, the skeleton of the multi-functional Michael acceptor may be a polymer, such as for example, a poly alkylene oxide, a polyurethane, a polyethylene vinyl acetate, a polyvinyl alcohol, a polydiene, a hydrogenated polydiene, an alkyd, an alkyd polyester, a (meth)acrylic polymer, a polyolefin, a polyester, a halogenated polyolefin, a halogenated polyester, a copolymer thereof, or a mixture thereof.

Some suitable multi-functional Michael acceptors in the present invention include, for example, molecules in which some or all of the structures (I) are residues of (meth)acrylic acid, fumaric acid, or maleic acid, substituted versions thereof, or combinations thereof, attached to the multi-functional Michael acceptor molecule through an ester linkage. A compound with structures (I) that include two or more residues of (meth)acrylic acid attached to the compound with an ester linkage is called herein a "poly-functional (meth)acrylate." Poly-functional (meth)acrylates with at least two double bonds capable of acting as the acceptor in Michael addition are suitable multi-functional Michael acceptors in the present invention.

Examples of suitable multi-functional Michael acceptors that are poly-functional (meth)acrylates include 1,4-butanediol diacrylate, 1,6-hexanediol diacrylate, neopentyl glycol diacrylate, diethylene glycol diacrylate, triethylene glycol diacrylate, tetraethylene glycol diacrylate, polyethylene glycol diacrylate, dipropylene glycol diacrylate, tripropylene glycol diacrylate, cyclohexane dimethanol diacrylate, alkoxylated hexanediol diacrylate, alkoxylated cyclohexane dimethanol diacrylate, propoxylated neopentyl glycol diacrylate, trimethylolpropane triacrylate, ethoxylated trimethylolpropane triacrylate, propoxylated trimethylolpropane triacrylate, acrylated polyester oligomer, bisphenol A diacrylate, ethoxylated bisphenol A diacrylate, tris(2-hydroxyethyl) isocyanurate triacrylate, acrylated aliphatic urethane oligomer, acrylated aromatic urethane oligomer, and the like, and mixtures thereof.

Also suitable as the multi-functional Michael acceptor are poly-functional (meth)acrylates in which the skeleton is polymeric. The (meth)acrylate groups may be attached to the polymeric skeleton in any of a wide variety of ways. For example, a (meth)acrylate ester monomer may be attached to a polymerizable functional group through the ester linkage, and that polymerizable functional group may be polymerized with other monomers in a way that leaves the double bond of the (meth)acrylate group intact. For another example, a polymer may be made with functional groups (such as, for example, a polyester with residual hydroxyls), which may be reacted with a (meth)acrylate ester (for example, by transesterification), to yield a polymer with pendant (meth)acrylate groups. For yet another example, a homopolymer or copolymer may be made that includes a poly-functional (meth)acrylate monomer (such as trimethylol propane triacrylate) in such a way that not all the acrylate groups react.

Preferred skeletons for multi-functional Michael acceptors have Mw of 5,000 or less, whether the skeleton is a polymer, oligomer, or other compound. More preferred are skeletons with Mw of 2,000 or less; most preferred are skeletons with Mw of 1,000 or less.

Mixtures of suitable multi-functional Michael acceptors are also suitable.

The multi-functional Michael donor of the present invention may have any of a wide variety of skeletons. In some embodiments, the skeleton of the multi-functional Michael donor is the residue of a polyhydric alcohol, such as, for example, those listed herein above. In some embodiments, the skeleton of the multi-functional Michael donor may be a polymer, such as for example, a poly alkylene oxide, a polyurethane, a polyethylene vinyl acetate, a polyvinyl alcohol, a polydiene, a hydrogenated polydiene, an alkyd, an alkyd polyester, a polyolefin, a polyester, a halogenated polyolefin, a halogenated polyester, an acrylic polymer, a copolymer thereof, or a mixture thereof.

Preferred skeletons of the multi-functional Michael donor have molecular weight of 200 or greater; more preferred are skeletons with molecular weight of 400 or greater.

In suitable multi-functional Michael donors, the functional groups with Michael active hydrogens may be attached to the skeletons in any of a wide variety of arrangements. In some embodiments, the multi-functional Michael donor has the structure

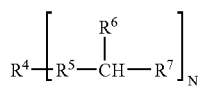

where N is at least 2;

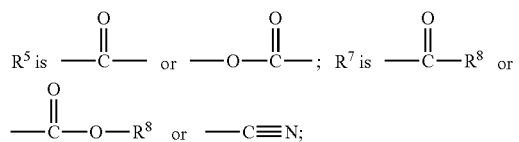

$R^6$ and $R^8$ are, independently, H, alkyl (linear, cyclic, or branched), aryl, alkaryl, or substituted versions thereof; and $R^4$ is a residue of any of the polyhydric alcohols or polymers discussed herein above as suitable as the skeleton of a multi-functional Michael donor. In some embodiments, $R^6$ will be the residue of a Michael acceptor. In some embodiments, $R^6$ or $R^8$ will be attached to further functional groups with Michael active hydrogens.

Some suitable multi-functional Michael donors include, for example, malonic acid, acetoacetic acid, amides of malonic acid, amides of acetoacetic acid, alkyl esters of malonic acid, and alkyl esters of acetoacetic acid, where the alkyl groups may be linear, branched, cyclic, or a combination thereof. Other suitable multi-functional Michael donors include polyhydric alcohols in which one or more hydroxyl group is linked to an acetoacetate group through an ester linkage. Some suitable multi-functional Michael donors are, for example, methyl acetoacetate, ethyl acetoacetate, t-butyl acetoacetate, other alkyl acetoacetates, 2-acetoacetoxyethyl (meth)acrylate, butane diol diacetoacetate, 1,6-hexanediol diacetoacetate, other diol diacetoacetates, trimethylol propane triacetoacetate, pentaerythritol triacetoacetate, other triol triacetoacetates, analogous malonate esters, and the like.

Additional suitable multi-functional Michael donors include compounds with one or more of the following functional groups: acetoacetate, acetoacetamide, cyanoacetate, and cyanoacetamide; in which the functional groups may be attached to one or more of the following skeletons: castor oil, polyester polymer, polyether polymer, (meth)acrylic polymer, polydiene polymer. Some suitable multi-functional Michael donors are, for example, acetoacetate functional castor oil, acetoacetate functional polyester polymer, acetoacetate functional polyesteramide polymer, acetoacetamide functional polyether polymer, acetoacetate functional (meth)acrylic polymer, cyanoacetamide functional (meth)acrylic polymer, cyanoacetate functional (meth)acrylic polymer, acetoacetate functional polybutadiene polymer.

Some preferred multi-functional Michael donors are multifunctional acetoacetate functional polyester polymers and acetoacetate functional polyesteramide polymers. That is, the skeleton of such a multi-functional Michael donor is a polyester polymer or a polyesteramide polymer. Preferred is a polyester polymer or a polyesteramide polymer with Mw of 1,000 or greater. Also preferred is a polyester polymer or a polyesteramide polymer with Mw of 10,000 or less. Acetoacetate functional polyester polymers may be made by any available method; one method, for example, is a two step process. In the first step, one or more polyhydric alcohol such as a diol or triol is condensed with one or more di- or tricarboxylic acids to form a polyester terminated with hydroxy radicals. In the second step, the polyester is reacted with an acetoacetate compound such as, for example, an alkyl acetoacetate with a alkyl group with 1 to 4 carbon atoms. Similarly, Acetoacetate functional polyesteramide polymers may be made by any available method; one method, for example, is a two step process. In the first step, one or more polyhydric alcohol such as a diol or triol, including at least one amino alcohol, is condensed with one or more di- or tricarboxylic acids to form a polyester terminated with hydroxy radicals. In the second step, the polyesteramide is reacted with an acetoacetate compound such as, for example, an alkyl acetoacetate with a alkyl group with 1 to 4 carbon atoms.

Mixtures of suitable multi-functional Michael donors are also suitable.

The curable mixture of the present invention also includes at least one anion of a Michael donor. In some embodiments of the present invention, the anion of a Michael donor is formed by reacting a Michael donor of functionality of 1 or higher with a strong base; Michael donors suitable for such reacting include any compound with at least one Michael donor functional group, including, for example, all of the multi-functional Michael donors disclosed herein. In some embodiments, the strong base is a neutral molecule with a tendency to separate into an anion and a cation. In some embodiments, the anion derived from the strong base reacts with the Michael donor. While the invention is not limited to a particular theory, it is believed that the anion derived from the strong base abstracts a Michael active hydrogen from the Michael donor, thus forming a new neutral compound, which may be removed, for example by evaporation if the new neutral compound is volatile. A Michael donor may be represented by D-M, where M is a Michael active hydrogen atom, and D is the remainder of the donor molecule.

As an example of formation of an anion of a Michael donor of the present invention, the donor D-M may be reacted with an alkali metal alkoxide, represented by $R^9$—OA, where $R^9$ is an alkyl group and A is an alkali metal. $R^9$ may be linear, branched, or cyclic alkyl group with 1 to 20 carbon atoms; preferred are alkyl groups with 1-4 carbon atoms; more preferred is an ethyl group. Some suitable alkali metal alkoxides include, for example, sodium methoxide, sodium ethoxide, sodium proproxide, sodium butoxide, potassium methoxide, and the like, and mixtures thereof. Sodium ethoxide is preferred. In this example, one reaction product is the alkyl alcohol $R^9$—OH, which may be removed by evaporation if it is volatile. Other reaction products of this example are $D^\ominus$ (the anion of the Michael donor) and $A^\oplus$ (the cation of the alkali metal), which may or may not be associated closely with each other as an ionic compound.

As another example of formation of an anion of a Michael donor of the present invention, the donor D-M may be reacted with an alkali metal hydroxide, represented by HOA, where A is the alkali metal. In this example, one reaction product is water, which may be removed by evaporation. Other reaction products of this example are $D^\ominus$ (the anion of the Michael donor) and $A^\oplus$ (the cation of the alkali metal), which may or may not be associated closely with each other as an ionic compound.

The anion of a Michael donor, in some embodiments, will be made by reacting a strong base with a Michael donor that has multiple Michael donor functional groups. In such embodiments, one or more Michael active hydrogens may be abstracted from the same Michael donor molecule.

The amount of anion of a Michael donor suitable for use in the curable mixture of the present invention may be characterized by the donor anion ratio, expressed as a percentage, which is defined herein as $$\text{donor anion ratio} = 100 \times \left(\frac{AN}{AN + MAH}\right)$$

where AN=moles of Michael active hydrogen atoms that were abstracted in the formation of anions of Michael donors; and MAH=moles of Michael active hydrogen atoms. In some embodiments, no more than one Michael active hydrogen will be abstracted per Michael donor functional group; in such embodiments, AN will also equal the number of Michael donor functional groups that are anionic. A donor anion ratio of 0.1% or more is suitable; preferred is 0.5% or more; more preferred is 1% or more; most preferred is 2% or more. A molar ratio of 20% or less is suitable; preferred is 10% or less; more preferred is 7% or less; most preferred is 4% or less.

While the present invention is not limited to any particular theory, it is contemplated that, in the practice of the present invention, the Michael addition reaction between the multi-functional Michael donor and the multi-functional Michael acceptor will take place, catalyzed by the anion of the Michael donor. In some embodiments, the curable mixture of the present invention will not contain any of the catalysts usually used for Michael addition reactions, herein called "usual Michael catalysts". Some of the usual Michael catalysts are alkali metal hydroxides, alkali metal alkoxides, quaternary ammonium hydroxides (such as tetraalkyl ammonium hydroxides), and amine compounds (such as diaza compounds, guanidine compounds, amidines including cyclic amidines, pyridine, imidazoline).

Those skilled in the art will recognize that some compounds that are usual Michael catalysts may be used in the preparation of an anion of a Michael donor; however, such compounds will be absent or substantially absent from the curable mixture of the present invention. For example, in some embodiments, the anion of a Michael donor will be produced by reacting an alkali metal alkoxide with a Michael donor, producing the alcohol, which is then removed by evaporation. In such embodiments, little or no alkali metal alkoxide remains in the curable mixture.

Preferred are curable mixtures of the present invention that contain 10 mole % or less of usual Michael catalysts, based on the moles of abstracted Michael active hydrogen atoms; preferred is 5 mole % or less; more preferred is 2 mole % or less; even more preferred is 1 mole % or less; most preferred is the absence of usual Michael catalysts.

In the practice of the present invention, one or more ingredients may contain volatile compounds, and it may be desirable to remove those compounds. Removal of volatile compounds may be accomplished by any means of evaporation, usually involving application of heat, reduced pressure, or a combination thereof. Examples of apparatus that may be used for removal of volatile compounds are rotary evaporators and wiped film evaporators.

In some embodiments of the present invention, it is preferred that the curable mixture that contains multi-functional Michael donor, multi-functional Michael acceptor, and anion of a Michael donor is substantially free of volatile nonreactive compounds. In other embodiments, it is preferred that the reaction products of the reaction between the multi-functional Michael donor and the multi-functional Michael acceptor be substantially free of volatile nonreactive compounds. In some embodiments, both the mixture and the products are substantially free of volatile nonreactive compounds. By "substantially free" herein is meant that the composition contains 5% or less of volatile nonreactive compounds. Preferred are mixtures with 2% or less of volatile nonreactive compounds; more preferred is 1% or less; even more preferred is 0.5% or less.

"Nonreactive" as used herein means compounds that are neither Michael donors of any functionality nor Michael acceptors of any functionality.

"Volatile" as used herein means compounds that have relatively low boiling points at atmospheric pressure. Preferred curable mixtures of the present invention are substantially free of nonreactive compounds that have boiling points of 120° C. or less; more preferred are substantially free of nonreactive compounds that have boiling points of 150° C. or less; still more preferred are substantially free of nonreactive compounds that have boiling points of 200° C. or less. Preferred reaction products of the reaction between the multi-functional Michael donor and the multi-functional Michael acceptor are substantially free of nonreactive compounds that have boiling points of 120° C. or less; more preferred are substantially free of nonreactive compounds that have boiling points of 150° C. or less; still more preferred are substantially free of nonreactive compounds that have boiling points of 200° C. or less.

In some embodiments of the present invention, in order to make an anion of a Michael donor, a Michael donor of functionality of 1 or greater will be mixed with a solution of a strong base in a volatile solvent. In these embodiments, some portion of the Michael donor will react with the strong base to from an anion of a Michael donor, and the resulting composition will be subjected to heat and/or reduced pressure to remove any volatile components. It is contemplated that the heat and/or reduced pressure will remove solvent and also remove any volatile products of the reaction between the Michael donor and the strong base.

In some embodiments, the anion of a Michael donor is made by reacting an amount of at least one multi-functional Michael donor with a strong base. In such embodiments, the invention may be practiced by using an excess of multi-functional Michael donor or donors; the products of such practice will be a mixture (herein called a "partially anionized mixture") containing a relatively small amount of anion(s) of a Michael donor mixed with a larger amount of a multi-functional Michael donor(s). This partially anionized mixture may be mixed with at least one multi-functional Michael acceptor to form the curable mixture of the present invention, without the addition of further multi-functional Michael donors or of further anions of Michael donors. Alternatively, at least one additional multi-functional Michael donor, which may be the same or different from the multi-functional Michael donor or donors already in the partially anionized mixture, may be included in the curable mixture. Also alternatively, at least one additional anion of a Michael donor, which may be the same or different from the anion of a Michael donor already in the partially anionized mixture, may be included in the curable mixture. In a third alternative, additional multi-functional Michael donor and additional anion of a Michael donor may both be added to the curable mixture.

The curable mixture of the present invention may also contain one or more adjuvants chosen to improve the properties, such as, for example, tackifiers, emulsifiers, polymers, plasticizers, or thickeners. Adjuvants are preferably chosen to be compatible with the curable mixture and used in a way that does not interfere with the practice of the invention (for example, adjuvants will preferably be chosen that do not interfere with the mixing of the ingredients, the low level of volatile nonreactive compounds, the cure of mixture, the application to substrate, or the final properties of the cured mixture).

Multi-pack systems may be used in some embodiments of the present invention. That is, the various ingredients are stored in two or more containers (or "packs"), until the contents of the containers are mixed together to form a curable mixture. Mixing may be performed at room temperature (25° C.) or at elevated temperature. The curable mixture is capable of being applied to a substrate; application to substrate may be performed at room temperature or at elevated temperature. The temperature of application to substrate may be the same or different from the temperature of mixing. It is contemplated that the curable mixture will have useful "pot life," which is the time from the start of the mixing process until the curable mixture can no longer be applied to a substrate.

Each individual pack in a multi-pack embodiment is preferably storage stable. That is, it is preferred that the pack may be stored at ambient conditions without substantial change in its ability to be mixed or to contribute to the curing process and to the properties of the cured mixture. That is, after storage of any or all of the packs, the viscosity of the curable mixture when the packs are freshly mixed, measured at the usual temperature of mixing, should be similar to the viscosity measured at that temperature of the curable mixture made from freshly-prepared packs (i.e., packs that have not been stored). Similarly, the viscosity of the curable mixture, measured at the usual temperature of applying to substrate (which may be the same or different from the temperature of mixing), should be similar when comparing curable mixtures made from freshly-prepared packs to curable mixtures made from packs, one or more of which has been stored. By "similar" viscosity in meant herein that the viscosity of the mixture is unchanged or changes up or down by a factor of 10× or less. Preferred are packs that can be stored without altering the viscosity of the curable mixture by a factor more than 5×; more preferred are packs that can be stored without altering the viscosity of the curable mixture by a factor more than 2×. Preferred are packs that are storage stable for 1 day or more; more preferred packs are stable for 1 week or more; still more preferred packs are stable for 1 month or more. Preferred packs are storage stable when stored at 20° C. to 30° C.; more preferred packs are storage stable when stored at 0° C. to 35° C.; even more preferred packs are storage stable when stored at −20° C. to 40° C.

In preferred multi-pack embodiments of the present invention, at least one pack is substantially free of nonreactive volatile compounds. "Nonreactive" as used herein means compounds that are neither Michael donors of any functionality nor Michael acceptors of any functionality. By "substantially free" herein is meant that the pack contains 5% or less of volatile nonreactive compounds. Preferred is a pack with 2% or less of volatile nonreactive compounds; more preferred is 1% or less; most preferred is 0.5% or less.

"Volatile" is defined herein above. In preferred multi-pack embodiments of the present invention, at least one pack is substantially free of nonreactive compounds that have boiling points of 120° C. or less; more preferred are embodiments with at least one pack that is substantially free of nonreactive compounds that have boiling points of 150° C. or less; still more preferred are embodiments with at least one pack that is substantially free of nonreactive compounds that have boiling points of 200° C. or less.

In some preferred embodiments, more than one pack is substantially free of volatile nonreactive compounds; most preferred are embodiments in which each pack is substantially free of volatile nonreactive compounds.

In multi-pack embodiments of the present invention, the ingredients may be arranged in the packs in any of a wide variety of ways, as long as the packs are storage stable and the curable mixture has the properties of the present invention. In some embodiments, one pack ("A") contains one or more multi-functional Michael donors and no Michael acceptors; a second pack ("B") contains one or more multi-functional Michael acceptors and no Michael donors; the anion of a Michael acceptor may be in either pack A, pack B, or a third pack ("C"), as long as each pack is storage stable. Any adjuvants, if used, may be present in any pack or packs.

In one preferred multi-pack embodiment, pack A contains one or more multi-functional Michael donors, one or more anions of Michael donors, and no Michael acceptors, while pack B contains one or more multi-functional Michael acceptors and no Michael donors. In one especially preferred version of this embodiment, pack A is made by reacting an excess of multifunctional Michael donor(s) with one or more strong bases to produce one or more anions of Michael donor(s); in this version, if any volatile nonreactive compounds are present, they are removed by evaporation. This preferred version may be practiced with a wide variety of the multi-functional Michael donors and the strong bases discussed herein; as one example, an excess molar amount of a multi-functional Michael donor with acetoacetate groups may be reacted with an alkali metal alkoxide, and the resulting alkyl alcohol may be removed by evaporation, and the resulting mixture may be used as pack A.

In a second preferred multi-pack embodiment, there are three packs. Pack A contains one or more multi-functional Michael donors, Pack B contains one or more multi-functional Michael acceptors, and Pack C contains one or more anions of a Michael donor. In some versions of this embodiment, one or more of the anions of a Michael donor present in Pack C is made by reacting one or more Michael donors with one or more strong bases. The concentration of anions of Michael donors in such a Pack C may be characterized by the ratio AHC, expressed as a percentage, defined herein as $$AHC = 100 \times (ASC/(ASC + MAHC))$$

where ASC is the moles of Michael active hydrogen atoms that were abstracted from the contents of Pack C, and MAHC is the moles of Michael active hydrogen atoms remaining in Pack C. The ratio AHC may have any value up to and including 100%. The compositions of Packs A, B, and C will be chosen so that the curable mixture formed by combining the packs will have donor anion ratio value as described herein above. In a preferred version of this second multi-pack embodiment, Pack A contains no Michael acceptors and no anions of Michael donor. In another preferred version, Pack B contains no Michael donors and no anions of Michael donors. In yet another preferred version, Pack C contains no Michael acceptors.

In a third preferred multi-pack embodiment, there are two packs, Pack C and Pack D. Pack C is the same as that of the second preferred multi-pack embodiment, and Pack D contains one or more multi-functional Michael donors and one or more multi-functional Michael acceptors. The ratio AHC is the same in this third preferred multi-pack embodiment as in the second preferred multi-pack embodiment. The compositions of Packs C and D will be chosen so that the curable mixture formed by combining the packs will have donor anion ratio value as described herein above. In a preferred version of this third preferred multi-pack embodiment, Pack D contains no anions of Michael donors.

The curable mixture of the present invention contains at least one multi-functional Michael donor, at least one multi-functional Michael acceptor, and at least one anion of a Michael donor. This curable mixture may be assembled by mixing the packs described above or by other means. Preferred curable mixtures are substantially free of volatile nonreactive compounds. The preferences for percentages of volatile nonreactive compounds and for the boiling points of volatile nonreactive compounds are the same for the curable mixture as for the packs described above.

It is contemplated that the ingredients of the curable mixture will be chosen so that Michael addition will take place under the conditions of practicing the invention. For example, a particular multi-functional Michael acceptor may undergo the Michael addition reaction with some multi-functional Michael donors leas readily than with other multi-functional Michael donors. Further, some anions of a Michael donor catalyze the Michael addition reaction more strongly than other anions of a Michael donor. Also, the Michael addition reaction proceeds more rapidly at higher temperatures. For example, methacrylate groups usually react more readily with cyanoacetate groups than with acetoacetate groups. However, even if the reaction between a specific multi-functional Michael donor and a specific multi-functional Michael acceptor is slow or ineffective, in some cases it will be possible to speed the reaction or make it effective by employing a more active anion of a Michael donor, by conducting the reaction at higher temperature, or both. The practitioner of the invention will readily be able to choose an effective combination of ingredients and temperature to practice the present invention effectively.

In some embodiments of the present invention, at least one multi-functional Michael donor has a Michael donor functional group that has two Michael active hydrogen atoms attached to the same carbon atom (herein called "Michael twin" hydrogen atoms). In some embodiments with Michael twin hydrogen atoms, during cure, after the first Michael twin hydrogen atom has been abstracted, the cure will normally proceed by first abstracting a hydrogen atom from a different Michael donor functional group instead of abstracting the second Michael twin hydrogen atom. In such embodiments, if most or all of the functional groups with Michael twin hydrogen atoms have had one or the Michael twin hydrogen atoms abstracted, then, if further Michael addition reactions take place, the second Michael twin hydrogen atom may be abstracted from such functional groups. In other embodiments with Michael twin hydrogen atoms, both Michael twin hydrogen atoms may be abstracted from a single Michael donor functional group before most or all of the functional groups with Michael twin hydrogen atoms have had one hydrogen atom abstracted. In the practice of the present invention, embodiments are contemplated that involve abstraction of Michael twin hydrogen atoms in any combination of the above embodiments.

The curable mixture of the present invention preferably has a useful pot life. One convenient method of measuring the pot life is to measure the time from the start of mixing until the viscosity of the mixture rises until it is so high that it can no longer be applied to a substrate. For any specific embodiment, the viscosity of the freshly-mixed curable mixture may be measured by any standard method, at the temperature of application to substrate; one useful measure of the pot life is the time required for the viscosity, at that temperature, to rise by a factor of 5×. Preferred pot life of the curable mixture is 5 minutes or more; more preferred is 10 minutes or more. Also preferred is pot life of 8 hours or less; more preferred is 4 hours or less; even more preferred is 1 hour or less; most preferred is 30 minutes or less. The pot life is normally measured at the temperature of application to substrate. For example, some embodiments will have a useful pot life at 25° C.; other embodiments will have a useful pot life at 50° C.; still other embodiments will have a useful pot life at whatever temperature is useful for performing the application to substrate, using the method of application appropriate for those embodiments.

In some embodiments, the curable mixture will reach the end of its potlife; it then will be referred to as a "cured mixture"; the cured mixture is the products of reacting the curable mixture. In preferred embodiments, the cured mixture will be substantially free of volatile nonreactiave compounds. As disclosed above, by "substantially free" herein is meant that the cured mixture contains 5% or less of volatile nonreactive compounds, based on the weight of the cured mixture. Preferred are cured mixtures with amount of volatile nonreactive compounds of 2% or less; more preferred is 1% or less; most preferred is 0.5% or less. Even more preferred are cured mixtures that are substantially free of all volatile compounds (that is, cured mixtures with 5% or less of all volatile compounds, based on the weight of the cured mixture). In this category, preferred are cured mixtures with amount of volatile compounds of 2% or less; even more preferred is 1% or less; most preferred is 0.5% or less.

Another embodiment of the invention is the method of using the curable mixture of the present invention to adhere substrates to each other. In this embodiment, the curable mixture is applied to a first substrate. The method of application may be by a number of ways known to those having ordinary skill in the art (for example brushing, spraying, roller coating, rotogravure coating, flexographic coating, flow coating, dipping, and combinations thereof) to form a continuous or discontinuous film of the composition, as desired. The composition may be applied at a level of 0.4 to 5.8 g/sq. meter. In some embodiments, the curable mixture will be applied at ambient temperature (approximately 25° C.); alternatively, the curable mixture may be applied at elevated temperature.

After the composition has been applied to the first substrate, it may then be contacted with another substrate to form a composite. The composite so formed is optionally subjected to applied pressure, such as passing it between rollers to effect increased contact of the substrates with the composition. In another embodiment of the invention, the composition may be simultaneously or sequentially applied to both surfaces of the first substrate, which composition are then simultaneously or sequentially bonded to two further substrates, which may be the same, or different. It is further contemplated that the composite construction may sequentially be bonded to other substrate(s) using the composition of the invention, or a different composition before or after the process described herein. The first and second substrates to be bonded in the method of this invention may be the same or different and include, for example plastics, metalized plastics, metal, and paper, which may have smooth or structured surfaces and may be provided in the form of rolls, sheets, films, foils etc.

In some embodiments of the present invention, the substrates are relatively thin and flat, and the resulting composites are called laminates. The substrates may be constructed in multi-ply laminate structures based upon polyalkylenes, such as polyethylenes, and polypropylenes, polyesters, and polyamides (nylon), metalized polypropylene, aluminum foil, etc. Examples of two-ply laminate constructions, include polypropylene/polypropylene, polyester/nylon, polyester/polyethylene, polypropylene/metallized polypropylene, polypropylene/aluminum foil, polyester/aluminum foil, polyamide/aluminum foil, etc.

It is contemplated that the curable mixture of the present invention will undergo a chemical reaction, called here "cure." While the invention is not limited to any particular theory, it is believed that cure begins when the curable composition is formed and that it continues at least until the end of the pot life, and may continue after that. In some embodiments, before the end of the pot life, a layer of the curable mixture will be applied to a substrate. In some of these embodiments, at least one further substrate will be contacted with the layer of curable mixture; often, the further substrate will be contacted with the layer curable mixture before the end of the pot life. Thus, in some embodiments, the cure will not finish until after the curable mixture and the substrates are in contact. It is contemplated that the cured mixture will form a useful adhesive bond between the substrates.

While the invention is particularly useful as an adhesive, it is contemplated that it is also applicable to coatings, polymeric foams, sealants, and elastomers. When used as a coating, the curable mixture will be applied to a substrate and then allowed to cure, and further substrates will not be brought into contact with the curable mixture. When used as a sealant, foam, or elastomer, the curable mixture may, for example, be placed in a mold or on a release surface and allowed to cure; the cured mixture could then be removed from the mold or release surface and used as intended.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. Additionally, if minimum range values of 1 and 2 are recited, and if maximum range values of 3, 4, and 5 are recited, then the following ranges are all contemplated: 1 to 3, 1 to 4, 1 to 5, 2 to 3, 2 to 4, and 2 to 5.

EXAMPLES

In the following Examples, these abbreviations and materials are used:
SR-259=polyethylene glycol (200) diacrylate, from Sartomer Co.
CD-501=propoxylated (6) trimethylol propane triacrylate, from Sartomer Co.
SR-306HP=tripropylene glycol diacrylate, from Sartomer Co.
Morcure™ 2000=diacrylate of diglycidyl ether bisphenol-A, from Rohm and Haas Co.
EB-8402=urethane diacrylate, from UCB Co.
SR-9003=propoxylated (2) neopentyl glycol diacrylate, from Sartomer Co.
SR-610=polyethylene glycol (600) diacrylate, from Sartomer Co.
IRR-214=cycloaliphatic diacrylate, from UCB Co.
GF-19=high slip low density polyethylene film, thickness 0.025 mm (1 mil)
PET=corona treated polyethylene terephthalate, 92 gauge
OPP=corona treated oriented polypropylene, thickness 0.025 mm (1 mil)
Al Foil=Aluminum foil, thickness 0.025 mm (1 mil)
LLDPE=linear low density polyethylene film, thickness 0.05 mm (2 mil)
Metalized OPP=metalized oriented polypropylene, thickness 0.025 mm (1 mil)

Example 1

Preparation of Michael Donor Resin BR1

A 2-liter, 4-neck, round-bottom flask was fitted with a mechanical stirrer, thermocouple, nitrogen inlet, steam-jacketed, Rashig ring packed Allyn condenser with take-off head and Fredrichs condenser and an addition funnel. The thermocouple was connected to a controller controlling a variable voltage transformer and heating mantle. Provision was also provided to apply vacuum to the system.

The flask was charged with 465.8 g (3.188 mol) of adipic acid, 257.4 g (1.550 mol) isophthalic acid, 495.0 g (5.494 mol) of 2-methyl-1,3-propandiol and 87.6 g (0.653 mol) of trimethylol propane and stirred and heated to 150° C. under a slow flow of $N_2$. Water began to form and steam was applied to the column jacket to facilitate removal. As water was collected, the temperature was increased in steps to 225° C. After about 7 hr the water distillation had slowed and 160 ml had collected. The reaction was cooled to 175° C. and 1.1 ml of Tyzor™ TBT catalyst (from DuPont Co.) was added. The pressure was reduced to 66.5 kPa (500 torr) and the temperature was maintained at 200° C. for an additional 5 hr until titration indicated an acid number less than 3.0.

The reaction temperature was adjusted to 100° C. and an additional 1.1 ml Tyzor™ TBT catalyst was added and stirred about 30 minutes. Ethyl acetoacetate (476.0 g, 3.659) was added to the reaction mixture at about 8 ml/min under a slow flow of nitrogen and at 79.8 kPa (600 torr) pressure. When the addition was complete (60 min) the temperature was increased to 130° C. and the pressure reduced to 66.5 kPa (500 torr) with steam on the column jacket to facilitate removal of the ethanol byproduct. The temperature was increased to 135° C. and then 140° C. over the next 2 hours and then held at that temperature for 7 hours. On the basis of ethanol recovered, the transesterification conversion was 77%.

Example 2

Preparation of Other Michael Donor Resins

Using the methods of Example 1, a Michael donor resin was made, using ingredients in the following molar proportions:

adipic acid: 1.00 moles per mole of adipic acid
2-methyl-1,3-propandiol: 1.16 moles per mole of adipic acid
trimethylol propane: 0.14 moles per mole of adipic acid
ethyl acetoacetate: 0.74 moles per mole of adipic acid Example 3

Preparation of Anion of Michael Donor NR1L

The acetoacetate-functional polyester polymer was prepared similar to Example 1 and was determined to have concentration of acetoacetate groups of 2.15 mmol/g (eq wt=466) and 0.02 mmol/g residual acid.

A 5-liter, 4-necked, round-bottom flask fitted with a mechanical stirrer, condenser, nitrogen inlet and addition funnel was charged with 3187.6 g polyester polymer from Example 1 (6.853 equivalent acetoacetate, 80 mmol residual acid) and stirred at room temperature under $N_2$ while 137 g of 21% sodium ethoxide (ethanol solution) was added evenly over about a 20 min period. Stirring continued an additional 30 min to give a clear yellow-red oil. The batch was processed on a wiped-film evaporator operating at 75° C. with pressure of approximately 1.3 kPa (10 torr) at a feed rate of about 7.5 g/min. The product has estimated concentration of acetoacetate groups of 2.15 mmol/g and a base concentration as the sodium enolate of 0.108 mmol/g.

Example 4

Preparation of Other Anions of Michael Donors

Using the methods of Example 3, the following anions of Michael donors were prepared, based on the Michael donors and amounts of sodium ethoxide shown:

| Anion of Michael Donor | Michael Donor | Mole Ratio of sodium to Acetoacetate |
|---|---|---|
| NR1M | BR1 | 0.05 |
| NR1H | BR1 | 0.10 |
| NR2M | BR2 | 0.05 |

Example 5

Preparation of Adhesive Formulations

Adhesive formulations were made by blending ingredients as follows. Percentages represent weight percent based on total weight of the adhesive formulation.

| Adhesive Formulation | Donor | Acceptor |
|---|---|---|
| AF01 | 73% NR1M | 27% SR-259 |
| AF02 | 73% NR1H | 27% SR-259 |
| AF03 | 68% NR1H | 32% CD-501 |
| AF04 | 75% NR1H | 25% SR-306HP |
| AF05 | 70% NR1H | 15% SR-259 |
|  |  | 15% Morcure ™ 2000 |
| AF06 | 71% NR1H | 14.5% SR-306HP |
|  |  | 14.5% Morcure ™ 2000 |
| AF07 | 64% NR1H | 17% SR-306HP |
|  |  | 17% EB-8402 |
| AF08 | 64% NR1L | 14.5% SR-306HP |
|  |  | 14.5% Morcure ™ 2000 |
| AF09 | 59% NR1M | 20.5% SR-306HP |
|  |  | 20.5% Morcure ™ 2000 |
| AF10 | 58% NR1M | 21% SR-9003 |
|  |  | 21% Morcure ™ 2000 |

A further series of adhesive formulations was made by blending ingredients as follows:

| Adhesive Formulation | Donor | Acceptor |
|---|---|---|
| AF11 | 74% NR2M | 13% SR-306HP |
|  |  | 13% Morcure ™ 2000 |
| AF12 | 73% NR2M | 11% SR-306HP |
|  |  | 16% Morcure ™ 2000 |
| AF13 | 70% NR2M | 21% SR-306HP |
|  |  | 9% Morcure ™ 2000 |
| AF14 | 68% NR1M | 22.5% CD-501 |
|  |  | 9.5% Morcure ™ 2000 |
| AF15 | 68.5% NR1M | 28% SR-610 |
| AF16 | 77.6% NR2M | 22.4% IRR-214 |
| AF17 | 75.8% NR1M | 24.2% IRR-214 |
| AF18 | 74% NR1M | 13% SR-306HP |
|  |  | 6.5% Morcure ™ 2000 |
|  |  | 6.5% IRR 214 |
| AF19 | 70.5% NR1M | 14.7% CD-501 |
|  |  | 6.5% Morcure 2000 |
|  |  | 6.5% IRR-214 |

Another further series of adhesive formulations was made by blending ingredients as follows:

| Adhesive Formulation | Donor | Acceptor |
|---|---|---|
| AF20 | 76% NR1M | 12% SR-306HP |
|  |  | 12% IRR-214 |
| AF21 | 75.7% NR2M | 6% Morcure ™ 2000 |
|  |  | 18.2% IRR-214 |
| AF22 | 76% NR1M | 6% SR-306HP |
|  |  | 18% IRR-214 |
| AF23 | 73% NR1M | 13.5% CD-501 |
|  |  | 13.5% IRR-214 |
| AF24 | 72% NR1M | 14% CD-501 |
|  |  | 3.5% Morcure ™ 2000 |
|  |  | 10.5% IRR-214 |
| AF25 | 72% NR2M | 14% CD-501 |
|  |  | 7% Morcure ™ 2000 |
|  |  | 7% IRR-214 |
| AF26 | 74.81% NR1M | 7.54% SR-306HP |
|  |  | 4.43% Morcure 2000 |
|  |  | 13.22% IRR-214 |
| AF27 | 74.1% NR1M | 11.65% Morcure ™ 2000 |
|  |  | 14.25% IRR-214 |
| AF28 | 74.15% NR1M | 6.45% Morcure ™ 2000 |
|  |  | 19.4% IRR-214 |
| AF29 | 74.5% NR1M | 6.4% CD-501 |
|  |  | 19.1% IRR-214 |

Example 6

Preparation and Testing of Laminates

Laminates were formed by coating adhesive formulations onto a first substrate; contacting a second substrate to the coating; and pressing the laminate between rollers. Some laminates were stored at room temperature (approximately 20° C.) for one, five, or seven days; other laminates (called "heat aged") were stored aged at 60° C. for 72 hours. A strip 25 mm (1 inch) wide was cut from each laminate. The strip was pulled apart in a tensile tester at speed of 4.2 mm/sec (10 in/min). The peel strength was recorded as the maximum load required to pull the strip apart. The results were as follows:

| Laminate No. | Adhesive No. | first/second Substrates | Coat Weight | Peel Results (g) | | | |
|---|---|---|---|---|---|---|---|
| | | | | 1 day | 5 day | 7 day | heat aged |
| L01 | AF08 | GF-19/PET | 3.7 g/m² (2.3 lb/ream) | 416 | 326 | 268 | 329 |
| L02 | AF09 | GF-19/PET | 3.1 g/m² (1.9 lb/ream) | 278 | 188 | 127 | 247 |
| L03 | AF10 | GF-19/PET | 3.4 g/m² (2.1 lb/ream) | 275 | 155 | 118 | 271 |
| L04 | AF11 | GF-19/PET | 2.1 g/m² (1.3 lb/ream) | 212 | 212 | 127 | 126 |
| L05 | AF12 | GF-19/PET | 2.1 g/m² (1.3 lb/ream) | 242 | 232 | 160 | 141 |
| L06 | AF13 | GF-19/PET | 2.0 g/m² (1.2 lb/ream) | 166 | 148 | 88 | 47 |
| L07 | AF14 | GF-19/PET | 2.9 g/m² (1.8 lb/ream) | 276 | 289 | 210 | 88 |
| L08 | AF15 | GF-19/PET | 2.1 g/m² (1.3 lb/ream) | 229 | 231 | 182 | 121 |

Using the same methods, a second series of laminates was prepared and tested. Results were as follows:

| L09 | AF16 | GF-19/PET | 2.6 g/m² (1.6 lb/ream) | 12 | 12 | 12 | 303 |
| L10 | AF17 | GF-19/PET | 4.4 g/m² (2.7 lb/ream) | 76 | 598 | 471 | 548 |
| L11 | AF18 | GF-19/PET | 4.1 g/m² (2.5 lb/ream) | 376 | 414 | 334 | 435 |
| L12 | AF19 | GF-19/PET | 4.7 g/m² (2.9 lb/ream) | 321 | 435 | 303 | 462 |
| L13 | AF20 | GF-19/PET | 2.8 g/m² (1.7 lb/ream) | 341 | 344 | 341 | 416 |
| L14 | AF21 | GF-19/PET | 2.3 g/m² (1.4 lb/ream) | 150 | 286 | 289 | 308 |
| L15 | AF22 | GF-19/PET | 2.9 g/m² (1.8 lb/ream) | 411 | 392 | 372 | 475 |
| L16 | AF23 | GF-19/PET | 3.3 g/m² (2.0 lb/ream) | 299 | 355 | 318 | 405 |
| L17 | AF24 | GF-19/PET | 3.3 g/m² (2.0 lb/ream) | 273 | 384 | 367 | 428 |
| L18 | AF25 | GF-19/PET | 1.8 g/m² (1.1 lb/ream) | 184 | 238 | 200 | 240 |
| L19 | AF26 | GF-19/PET | 3.9 g/m² (2.4 lb/ream) | 755 | 500 | 525 | 600 |

Using the same methods, a third series of laminates was prepared and tested. Results were as follows:

| L20 | AF27 | GF-19/PET | 3.1 g/m² (1.9 lb/ream) | 470 | 372 | 388 | 442 |
| L21 | AF28 | GF-19/PET | 3.9 g/m² (2.4 lb/ream) | 809 | 682 | 673 | 619 |
| L22 | AF29 | GF-19/PET | 3.6 g/m² (2.2 lb/ream) | 765 | 529 | 569 | 535 |
| L28 | AF28 | PET/Al Foil | 3.9 g/m² (2.4 lb/ream) | 635-967** | 430 | 328 | 397 |

**wide range of results

Using the same methods, a fourth series of laminates was prepared and tested. In this case, the laminates were tested after 1, 3, and 7 days storage at room temperature. Results were as follows:

| Laminate No. | Adhesive No. | first/second Substrates | Coat Weight | Peel Results (g) | | | |
|---|---|---|---|---|---|---|---|
| | | | | 1 day | 3 day | 7 day | heat aged |
| L23 | AF28 | GF-19/PET | 4.1 g/m² (2.5 lb/ream) | 785 | 705 | 703 | 588 |

-continued

| Laminate No. | Adhesive No. | first/second Substrates | Coat Weight | Peel Results (g) | | | |
|---|---|---|---|---|---|---|---|
| | | | | 1 day | 3 day | 7 day | heat aged |
| L24 | AF28 | OPP/OPP | 3.1 g/m² (1.9 lb/ream) | 353 | 336 | 325 | 341 |
| L25 | AF28 | GF-19/ Al Foil | 4.4 g/m² (2.7 lb/ream) | 955 | 854 | 776 | 741 |
| L26 | AF28 | LLDPE/ PET | 3.7 g/m² (2.3 lb/ream) | 600-1200* | 567-767* | 524 | 458 |
| L27 | AF28 | GF-19/ Metalized OPP | 3.9 g/m² (2.4 lb/ream) | 249 | 238 | 235 | 188 |

*LLDPE film stretched

Example 7

An Acetoacetate Functional Michael Donor on the Basis of Castor Oil

A 1-liter, 4-neck, round-bottom flask is charged with 500 g (1.46 eq. OH) of Castor Oil (COLM grade, Hydroxyl Value=164) and warmed to 100° C. under a slow flow of $N_2$. Tyzor™ TBT catalyst (1.25 g) is added to the flask. With stirring, 199.5 g (1.53 mol) of ethyl acetoacetate is gradually added, under partial vaccuum. The progress of the reaction can be monitored by the amount of ethanol recovered. When conversion reaches at least 80% of theory, the pressure is reduced to 13.3 kPa (100 torr) or less, and the remaining volatiles (ethanol, acetone, excess ethyl acetoacetate) removed. The product is a yellow oil and has 1.95 mmol/g acetoacetate functionality as well as 0.03 mmol/g of acids introduced with the castor oil.

Example 8

Anion of a Michael Donor 500 g of the product of Example 7 is stirred at room temperature under $N_2$ while 21.1 g of 21% sodium ethoxide (ethanol solution) is added. The product is then stripped by processing on a 2" wiped-film evaporator operating at 75° C. under a pressure of 1.3 kPa (10 torr) or less to yield a clear yellow-red oil. The product is an acetoacetate-functional Michael donor with concentration of acetoacetate groups of 1.95 mmol/g and concentration of Michael donor anions of 0.098 mmol/g.

Example 9

Michael Donor Based on Acetoacetamide

A 2-liter, 4-neck, round-bottom flask is charged with 148 g (1 mol) Jeffamine™ EDR-148 (2 eq primary amine, from Huntsman Performance Chemicals Co.) and 400 ml toluene and heated to 100° C. with stirring under $N_2$. 2,2,6-Trimethyl-4H-1,3-dioxin-4-one (298.9 g, 2 mol at 95%) is added over a period of 1 hour to the rapidly stirring solution and the temperature is allowed to increase to 110° C. as acetone is removed by distillation. When it is determined that the reaction is essentially complete, vacuum is cautiously applied to the flask to continue removal of most of the toluene. The product is isolated by processing on a wiped film evaporator operating at 110° C. with a pressure of 13.3 kPa (10 torr) or less to give a reddish oil. The concentration of acetoacetamide is about 6.33 mmol/g.

Example 10

Anion of a Michael Donor

A 1-liter, 4-necked, round-bottom flask is charged with 300 g of the product of Example 9 and stirred at room temperature under $N_2$ while 18.8 g of 21% sodium ethoxide (ethanol solution) is added, with stirring. Then the product is stripped on a wiped-film evaporator operating at 75° C. as above to yield a clear red oil. The product is an acetoacetamide-functional Michael donor with concentration of acetoacetamide groups of 6.33 mmol/g and concentration of Michael donor anions of 0.190 mmol/g.

Example 11

An Cyanoacetamide Functional Michael Donor Based on Polyether Diamine

A flask is charged with 297 g (3.0 mol) of methyl cyanoacetate and stirred under $N_2$ at room temperature (15-25° C.). Jeffamine™ D230 (polyoxypropylenediamine, Mw ~225) (330 g, 3.0 mol maximum acetylatables) is charged to the addition funnel and added slowly to the kettle with efficient stirring. The rate of addition is controlled to keep the temperature of the batch below 65° C. After the addition is complete, the reaction is stirred and the temperature is maintained at 65° C. until analysis (nmr, ir, and/or titration) indicates complete reaction. The reaction is cooled to 40° C. and vacuum is cautiously applied to distill the methanol reaction byproduct, finishing up at full vacuum to remove all volatile byproduct and excess reactant. The product is a red oil with a theory cyanoacetamide concentration of 5.65 mmol/g.

Example 12

Anion of a Michael Donor

A 1-liter, 4-necked, round-bottom flask is charged with 300 g of the product of Example 11 and stirred at room temperature under $N_2$ and 4.1 g of 50% sodium hydroxide (water solution) is added with stirring. Then the product will be stripped by processing on a wiped-film evaporator operating at 75° C. as above to take off the water. The product is a cyanoacetamide-functional Michael donor with concentration of cyanoacetamide groups of 5.65 mmol/g and concentration of Michael donor anions of 0.170 mmol/g.

Example 13

An Cyanoacetate Functional Michael Donor Based on Acrylic Polymer

The procedure used to prepare the butyl acrylate/glycidyl methacrylate oligomer precursor was substantially the same as described in Example ID in U.S. Pat. No. 6,433,098. The BA/GMA oligomer thus prepared was nominally degree of polymerization 6 with an average mole unit formula of 3.3 BA/2.7 GMA (equivalent weight=292; 2.7 epoxy-functional).

A 500 ml, 4-neck round bottom flask fitted with a thermocouple, mechanical stirrer and condenser was charged with 230 g (0.788 eq of epoxy) of the BA/GMA oligomer and 67.0 g (0.788 mol) of cyanoacetic acid. The thermocouple controlled an automatic jack used to raise a heating mantle and provide air cooling. The mixture was warmed to 65° C. As the temperature reached about 60° C. in 24 min the mixture cleared and continued to exotherm to 90° C. in about 3 minutes. The reaction was cooled with a water bath and then held at 80° C. for 4 hr. The acid titer was 0.178 mmol/g. The reaction was heated and stirred further until an acid titer of 0.049 mmol/g was achieved (estimated conversion=98%) The nmr indicated the reaction of most of the epoxy functionality. The theory concentration of cyanoacetate functionality is 2.65 mmol/g and there is 0.049 mmol/g of residual carboxylic acid functionality.

Example 14

Anion of a Michael Donor

A 1-liter, 4-necked, round-bottom flask is charged with 297 g of the product of Example 13 and stirred at room temperature under $N_2$ while 17.7 g of 21% sodium ethoxide (ethanol solution) is added. The product is stripped by wiped-film evaporator at 75° C. as above to yield a clear viscous oil. The product is an acetoacetamide-functional Michael donor with concentration of cyanoacetic groups of 2.65 mmol/g and concentration of Michael donor anions of 0.133 mmol/g.

Example 15

An acetoacetate Functional Polyester Michael Donor

The preparation of Example 1 was repeated.

Example 16

Anion of a Michael Donor

The preparation of Example 3 was repeated.

Example 17

An Acetoacetate Functional Michael Donor from Hydroxyl Terminated Polybutadiene A 1-liter, 4-neck, round-bottom flask is charged with 500 g (0.9 eq. OH) of Poly bd R20LM Resin (Sartomer, Hydroxyl Value=101) and warmed to 100° C. under a slow flow of $N_2$. Tyzor™ TBT catalyst (1.15 g) is added to the flask and the addition funnel is charged with 130 g (1.0 mol) of ethyl acetoacetate. While maintaining the slow flow of $N_2$ and partial vacuum, the ethyl acetoacetate is added to the stirred mixture. Then the temperature is increased to 130° C. and pressure is lowered. When conversion reaches at least 80% of theory, the pressure is lowered to remove the remaining volatiles (ethanol, acetone, excess ethyl acetoacetate). The product will be a yellow oil with 1.28 mmol/g acetoacetate functionality.

Example 18

Anion of a Michael Donor

A 1-liter, 4-necked, round-bottom flask is charged with 500 g of the acetoacetate functional polybutadiene product of Example 17 and stirred at room temperature under $N_2$ while 21.1 g of 21% sodium ethoxide (ethanol solution) is added. Then the product will be stripped by wiped-film evaporator at 75° C. under a vacuum as above to yield a clear yellow-red oil. The product is an acetoacetate-functional Michael donor with concentration of acetoacetate groups of 1.88 mmol/g and concentration of Michael donor anion of 0.094 mmol/g.

Example 19

Demonstration of Michael-Reaction Cure

A catalyzed Michael donor prepared from acetoacetate-functional polyester and a poly-functional acrylate.

A 13.47 g aliquot of the catalyzed polyester acetoacetate of example 17 and 11.50 g of polyethylene glycol (600) diacrylate (Sartomer SR-610) were equilibrated in a 25° C. water bath. At time zero, the two polymers were well mixed in a 1 oz vial and setup to measure viscosity at 25° C. (Brookfield viscometer, #4 spindle at 60 rpm). The viscosity was initially about 0.95 Pas (950 cps) rising to 9.73 Pas (9730 cps) in 77 min. The viscosity doubled in 21.3 min.

Examples 20-25

Adhesive Formulations

An adhesive formulation can be demonstrated using the catalyzed Michael donor polymers of Examples 8, 10, 12, 14, 16, and 18 and the poly-functional acrylate polyethylene glycol (600) diacrylate (Sartomer SR-610). The mixture ratio is calculated to provide 1 mol of acetoacetate, acetoacetamide, cyanoacetate or cyanoacetamide moiety per mol of acrylate moiety.

| Example | Michael Donor | Wt Michael Donor (g) | Wt Sartomer SR-610 (g) |
|---|---|---|---|
| 20 | Ex. 8 | 10 | 7.75 |
| 21 | Ex. 10 | 10 | 25.17 |
| 22 | Ex. 12 | 10 | 22.46 |
| 23 | Ex. 14 | 10 | 10.53 |
| 24 | Ex. 16 | 10 | 8.55 |
| 25 | Ex. 18 | 10 | 5.09 |

The catalyzed Michael donor component is mixed with the Sartomer SR-610 immediately before application and applied as a thin film to a 2.0 mil sheet of polyester and laminated to another sheet of polyester. The adhesion is tested after 1 day and 7 days at room temperature by pulling the sheets apart using a tensile tester Each example performs as a laminating adhesive.

Example 26

Adhesive Formulation Using a Polyether Diacrylate, Polyurethane Diacrylate, Polyester Acetoacetate Michael Donor and the Anion of a Michael Donor Prepared from Polybutadiene Acetoacetate The adhesive consists of a Part A consisting of the polyfunctional acrylate mixture and an uncatalyzed acetoacetate functional polymer. Part B is the catalyzed polybutadiene acetoacetate.

Part A (10.0 g) is prepared by mixing:
(i) 4.2 g Polyester Acetoacetate=(Ex. 15) (9.03 mmol AcAc)
(ii) 4.0 g Polyurethane Diacrylate=Ebecryl™ 8402 (UCB) (8.8 mmol acrylate)
(iii) 1.8 g Polyethylene glycol (200) diacrylate=Sartomer SR-259 (10.6 mmol acrylate)

Part B consists of 8.0 g polybutadiene bis-acetoacetate (10 mol % sodium enolate) (Ex. 18) (10.24 mmol AcAc).

The adhesive is prepared by mixing Part A with Part B. The concentration of AcAc moiety in the formulation is estimated to be 1.07 mmol/g. The concentration of acrylic functionality in the formulation is estimated to be 1.08 mmol/g. The catalyst concentration (not corrected for any residual acids introduced with Part A) is 0.057 mmol/g. The mixed adhesive is used to laminate polyester film and tested as described in examples 20-25. The laminates have useful peel test values.

We claim:

1. A curable mixture comprising at least one multi-functional Michael donor, at least one multi-functional Michael acceptor, and at least one anion of a Michael donor, wherein said curable mixture comprises 5% or less by weight nonreactive volatile compounds that have boiling points of 120° C. or less, based on the total weight of said curable mixture, wherein each Michael acceptor functional group in said multifunctional Michael acceptor is a residue of acrylic acid, methacrylic acid, fumaric acid, or maleic acid.

2. The curable mixture of claim 1 wherein said multi-functional Michael donor has at least two acetoacetoxy functional groups and wherein said multi-functional Michael donor has a skeleton selected from the group consisting of
(a) polyhydric alcohols that have molecular weight 200 or greater,
(b) oligomers that have weight-average molecular weight of 400 to 1,000, and
(c) polymers that have weight-average molecular weight of 1,000 or more.

3. The curable mixture of claim 1 wherein said anion of a Michael donor comprises a reaction product of an acetoacetoxy functional molecule with an alkali metal alkoxide, wherein said acetoacetoxy functional molecule has a skeleton selected from the group consisting of
(a) polyhydric alcohols that have molecular weight 200 or greater,
(b) oligomers that have weight-average molecular weight of 400 to 1,000, and
(c) polymers that have weight-average molecular weight of 1,000 or more.

4. The curable mixture of claim 1 wherein said multi-functional Michael acceptor has a skeleton selected from the group consisting of
(a) polyhydric alcohols,
(b) oligomers that have weight-average molecular weight of 400 to 1,000, and
(c) polymers that have weight-average molecular weight of 1,000 or more;
with the proviso that when said multi-functional Michael acceptor has said skeleton (a), the molecular weight of said multi-functional Michael acceptor is 5,000 or less; and with the further proviso that when said multi-functional Michael acceptor has said skeleton (b) or said skeleton (c), the weight-average molecular weight of said multi-functional Michael acceptor is 5,000 or less.

5. The curable mixture of claim 1 wherein the reactive equivalent ratio of said curable mixture is in the range of 0.1:1 to 2:1.

6. The curable mixture of claim 1 wherein the donor anion ratio of said curable mixture is in the range of 0.5% to 10%.

7. The curable mixture of claim 1, wherein at least one of said anion of a Michael donor is an anion of a Michael donor that has the same composition as at least one of said multi-functional Michael donor.

8. The curable mixture of claim 1 wherein at least one of said multi-functional Michael donor has two or more functional groups with the structure

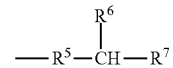

wherein

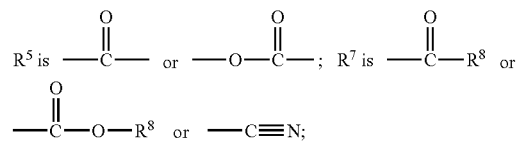

and $R^6$ and $R^8$ are, independently, H, alkyl, aryl, or alkaryl.

9. The curable mixture of claim 8 wherein at least one of said multi-functional Michael donor is selected from the group consisting of
(i) polyhydric alcohols in which one or more hydroxyl group is linked to an acetoacetate group through an ester linkage, and
(ii) compounds containing one or more functional groups selected from the group consisting of acetoacetate, acetoacetamide, cyanoacetate, and cyanoacetamide;
wherein said functional groups are attached to one or more skeleton selected from the group consisting of castor oil, polyester polymer, polyether polymer, acrylic polymer, methacrylic polymer, and polydiene polymer.

10. The curable mixture of claim 2 wherein at least one said multi-functional Michael donor has a skeleton that is a polyhydric alcohol that has molecular weight of 200 or more.

11. The curable mixture of claim 1 wherein alkali metal hydroxides, alkali metal alkoxides, quaternary ammonium hydroxides, diaza compounds, guanidine compounds, amidines, pyridine, and imidazoline are absent or substantially absent from said mixture.

12. The curable mixture of claim 4 wherein at least one of said multi-functional Michael acceptors has a skeleton that is a polyhydric alcohol.

13. The curable mixture of claim 1 wherein said multi-functional Michael acceptor has a skeleton selected from the group consisting of
(a) polyhydric alcohols,
(b) oligomers that have weight-average molecular weight of 400 to 1,000, and
(c) polymers that have weight-average molecular weight of 1,000 or more;

with the proviso that when said multi-functional Michael acceptor has said skeleton (a), the molecular weight of said multi-functional Michael acceptor is 2,000 or less; and with the further proviso that when said multi-functional Michael acceptor has said skeleton (b) or said skeleton (c), the weight-average molecular weight of said multi-functional Michael acceptor is 2,000 or less.

14. The curable mixture of claim 1 wherein said multi-functional Michael acceptor has a skeleton selected from the group consisting of
(a) polyhydric alcohols, and
(b) oligomers that have weight-average molecular weight of 400 to 1,000;

with the proviso that when said multi-functional Michael acceptor has said skeleton (a), the molecular weight of said multi-functional Michael acceptor is 1,000 or less; and with the further proviso that when said multi-functional Michael acceptor has said skeleton (b), the weight-average molecular weight of said multi-functional Michael acceptor is 1,000 or less.

15. The curable of claim 1, wherein said curable mixture does not contain any of the catalysts usually used for Michael addition reactions.

16. The curable mixture of claim 1, wherein said curable mixture comprises 2% or less by weight non-reactive volatile compounds, based on the total weight of said curable mixture.

17. The curable mixture of claim 1, wherein said curable mixture comprises 1% or less by weight non-reactive volatile compounds, based on the total weight of said curable mixture.

18. The curable mixture of claim 1, wherein said curable mixture is substantially free of non-reactive volatile compounds.

19. The curable mixture of claim 8, wherein said curable mixture does not contain any of the catalysts usually used for Michael addition reactions.

20. The curable mixture of claim 19, wherein at least one of said anion of a Michael donor is an anion of a Michael donor that has the same composition as at least one of said multi-functional Michael donor.

* * * * *